United States Patent [19]

Okita

[11] Patent Number: 4,791,513
[45] Date of Patent: Dec. 13, 1988

[54] BUTTON SHAPED HEAD FOR FLOPPY DISC

[75] Inventor: Masao Okita, Furukawa, Japan

[73] Assignee: Alps Electric Co., Ltd., Japan

[21] Appl. No.: 161,349

[22] Filed: Feb. 19, 1988

Related U.S. Application Data

[63] Continuation of Ser. No. 780,575, Sep. 26, 1985, abandoned.

[30] Foreign Application Priority Data

Sep. 26, 1984 [JP] Japan .................................. 59-14429[U]

[51] Int. Cl.[4] ........................ G11B 5/48; G11B 21/16; G11B 5/127
[52] U.S. Cl. ........................................ 360/104; 29/603
[58] Field of Search ................... 360/104, 129; 29/603

[56] References Cited

U.S. PATENT DOCUMENTS

| | | | |
|---|---|---|---|
| 4,315,293 | 2/1982 | Winkler | 360/104 |
| 4,327,388 | 4/1982 | Wanek | 360/104 |
| 4,343,025 | 8/1982 | Kronfeld et al. | 360/104 |
| 4,432,027 | 2/1984 | Higuchi | 360/104 |
| 4,520,555 | 6/1985 | Gyi et al. | 360/126 |

FOREIGN PATENT DOCUMENTS

| | | | |
|---|---|---|---|
| 8101071 | 4/1981 | European Pat. Off. | 360/104 |
| 52-6514 | 1/1977 | Japan | 360/104 |
| 53-30311 | 3/1978 | Japan | 29/603 |
| 53-30310 | 3/1978 | Japan | 360/104 |
| 59-60761 | 4/1984 | Japan | 360/104 |
| 59-79417 | 5/1984 | Japan | 29/603 |

Primary Examiner—John H. Wolff
Assistant Examiner—Matthew J. Bussan
Attorney, Agent, or Firm—Guy W. Shoup; Paul J. Winters

[57] ABSTRACT

In a button shaped magnetic head used for a floppy disc apparatus, a planar spring and a plurality of terminals are inititally formed integrally and insert molded to be contained in a button shaped base, the planar spring and the terminals are then separated from each other, an erasing coil and a read/write coil are mounted on one side of the planar spring, ends of coil wires of the erasing coil and the read/write coil are connected with internal end portions of the terminals relative to the base, while outer end portions of the terminals extending radially outwardly of the base are connected with lead wires.

6 Claims, 4 Drawing Sheets

BUTTON SHAPED HEAD FOR FLOPPY DISC

This is a continuation application from application Ser. No. 780,575 filed Sept. 26, 1985, now abandoned.

BACKGROUND OF THE INVENTION

1. Field of the Invention

This invention relates to a magnetic head for a floppy disc apparatus, and more particularly to a button shaped magnetic head including an erasing coil and a read/write coil.

2. Description of Prior Art

FIGS. 5 and 6 illustrate a conventional button shaped magnetic head in which a planar spring 1 is secured to a button base 13 by forcibly inserting the spring or by use of a bonding agent. On the planar spring 1, a read/write (R/W) coil 9 and an erasing coil 7 are provided in combination, and terminals 2 are also secured by bonding or in a forcibly inserted manner so that the terminals 2 project from the button base 13 perpendicularly. Each terminal 2 has a portion 2a to be connected with an end of coil wire and another portion 2b to be connected with a lead wire (see FIG. 6).

In the above described construction of a button shaped magnetic head, however, since the ends of coil wires are connected with the connecting portions 2a of the terminals 2 provided outside of a shielding ring 12, shielding effect of the shielding ring 12 cannot be sufficient and another shielding plate must be secured after the magnetic head has been assembled on a carriage. Furthermore, since the ends of a coil wire and a lead wire are connected to a commonly provided terminal 2, the end portion of the coil wire tends to be broken by a tension applied by the lead wire. The conventional construction further entails a drawback of requiring a long coil wire between the coil and the connecting portion 2a of the terminal 2.

SUMMARY OF THE INVENTION

An object of the present invention is to provide a button shaped magnetic head for a floppy disc apparatus, wherein the above described difficulties of the conventional construction can be substantially eliminated.

Another object of the invention is to provide a button shaped magnetic head for a floppy disc apparatus, wherein the construction of the terminals is substantially simplified and the construction cost of the magnetic head can be substantially economized.

These and other objects of the invention can be achieved by a button shaped magnetic head for a floppy disc apparatus, wherein a planar spring and a plurality of terminals are initially formed integrally and insert molded to be contained in a button shaped base, the planar spring and the terminals are then separated from each other, and each of the terminals thus separated is provided with an internal end portion relative to the base to be connected with a coil wire and another end portion extending radially outwardly of the base to be connected with a lead wire.

DESCRIPTION OF THE PREFERRED EMBODIMENT

Figure 4A:
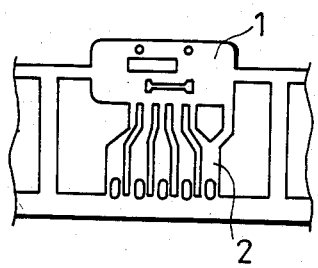
FIGS. 4(a) through 4(f) are diagrams showing production processes of a button shaped base, planar spring, and terminals constituting important parts of the embodiment.
Figure 4B:
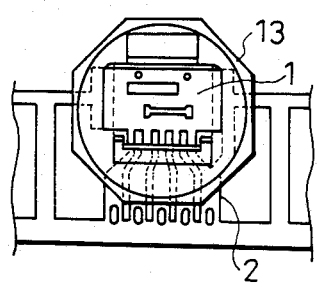
Figure 4C:
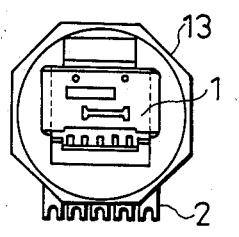
Figure 4D:
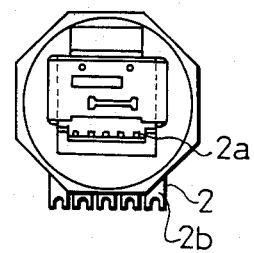
Figure 4E:
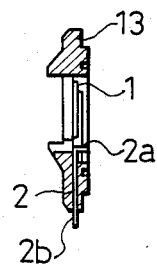
Figure 4F:
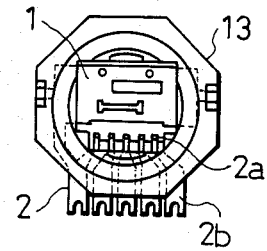
Figure 5:
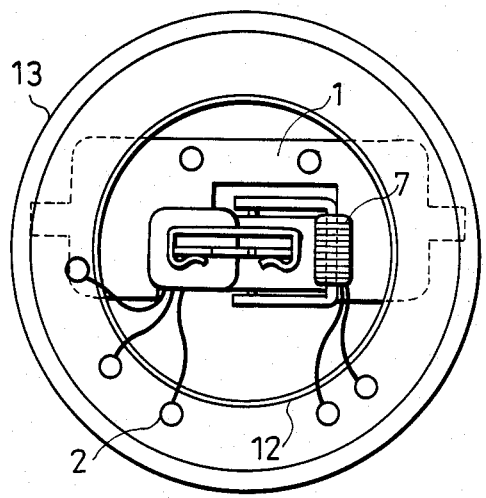
FIGS. 5 and 6 are a plan view taken from the rear side and a sectional view showing a conventional button shaped magnetic head, respectively.
Figure 6:
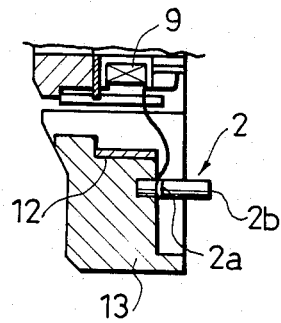

A preferred embodiment of the present invention will now be described with reference to FIGS. 1 through 4 wherein similar members as those in FIGS. 5 and 6 are designated by similar reference numerals.

Figure 1:
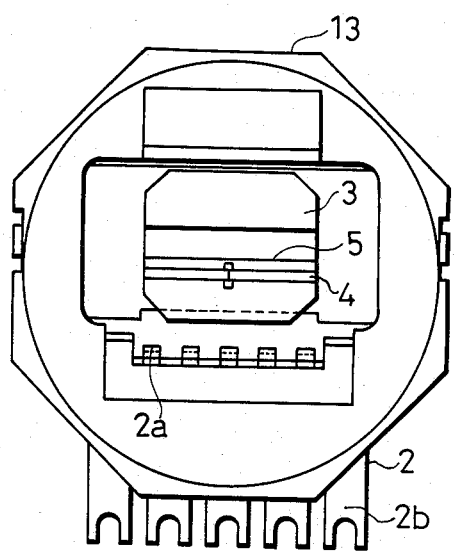
FIG. 1 is a plan view showing a button shaped magnetic head for use with a floppy disc apparatus, which constitutes a preferred embodiment of the present invention.
Figure 2:
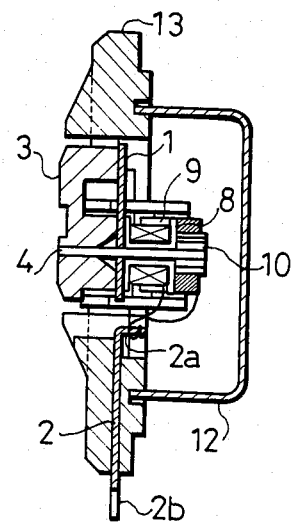
FIG. 2 is a sectional view of the embodiment shown in FIG. 1.
Figure 3:
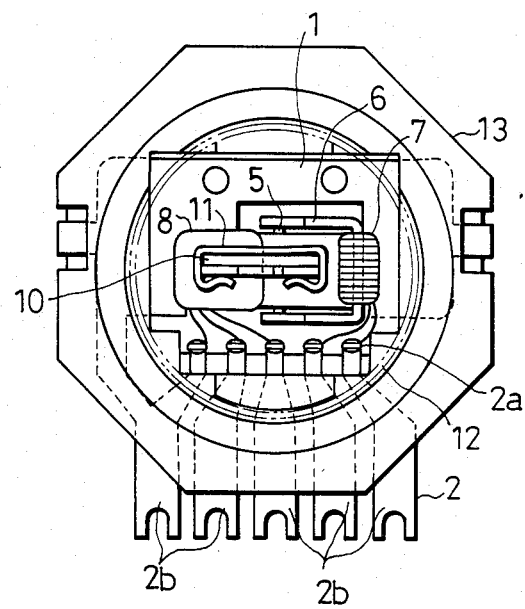
FIG. 3 is a plan view taken from the rear side of the embodiment.

According to the invention, a planar spring 1 and a plurality of terminals 2 are insert molded in a button shaped base 13. As clearly illustrated in FIG. 2, a head base 3 is secured on one side of the planar spring 1, while an erasing core 5, erasing yoke 6, erasing coil bobbin 8, read/write (R/W) coil 9, yoke 10 and a fixed plate 11 are mounted on the other side of the planar spring 1. A shielding cap 12 is further provided to cover the members provided on the other side of the planar spring 1. The positional relation between the head base 3 and the button shaped base 13 is indicated in FIG. 1, while the positional relation between the erasing coil 7 and the read/write coil 9 provided in the button shaped base 13 is indicated in FIG. 3.

The arrangement of the planar spring 1, terminals 2 and the button shaped base 13 will now be described. The planar spring 1 and the terminals 2 of this embodiment are made integrally out of a metal plate which has been punched out in a repeated pattern as shown in FIG. 4(a). The metal plate is then insert molded in the base 13, and then separated into a planar spring 1 and five terminals 2 in this example. Each of the terminals 2 is bent at a portion adjacent to the planar spring 1 secured to the base 13 into a portion 2a which is connected with an end of a coil wire forming the erasing coil 7 or the read/write coil 9. The other end of the terminal 2 projecting radially outwardly from the button shaped base 13 is formed into a portion 2b connected with a lead wire.

The magnetic head according to the present invention exhibits following advantageous features.

(1) Since planar spring 1 and terminals 2 initially formed integrally are insert molded in the button shaped base 13, hereinbefore described bonding or forced insertion step of these members is made unnecessary, and erroneous deviation in the measurements of these members can be substantially reduced.

(2) The magnetic head can be formed into a planar and reduced thickness configuration, thus facilitating assembling and connection of wires.

(3) The distances between the coils (erasing coil 7 and R/W coil 9) and the coil wire connecting portions 2a of the terminals 2 are reduced, while the portions 2a being sufficiently seprated from the soldering portions 2b of the terminals, the possibility of causing disconnection of coil wires can be substantially reduced.

(4) The shielding ring and the shielding plate used in the conventional construction can be combined into a single shielding cap 12.

(5) The precision in positioning (location and orientation) of the head (head base 3) relative to the button shaped base 13 can be improved.

(6) A ground terminal for the planar spring 1 is also formed integrally, by leaving one terminal portion (right side portion in FIG. 4a) connected to planar spring 1, and no separate earth connection is required for the planar spring.

(7) The component members are formed into blocks, so that the inspection and handling thereafter of the members are simplified.

(8) The magnetic head is formed into a simple construction with a reduced thickness and size, and hence it is well adapted for mass-production for economizing the production cost.

(9) The thickness of the head carriage and the driving device thereof can be reduced.

(10) Tension applied to the lead wire causes no adverse effect on the coil.

(11) The attachment of the magnetic head to the carriage can be simplified.

(12) Since connected wires reduced in length are encased in the shielding cap 12, the shielding effects thereof can be improved.

According to the present invention, since the integrally formed planar spring and terminals are separated from each other after these are insert-molded in a button shaped base, and each of the thus separated terminals is formed to provide a coil wire connecting portion located in the base and a lead wire connecting portion extending radially outwardly from the base, the conventional procedures of bonding and forced insertion of the planar spring and the terminals are not required any more, and a button shaped magnetic head to be used with a floppy disc apparatus, which exhibits advantageous features such as eliminating the adverse effects on the coils caused by pulling the lead wire, facilitating mass-production, and reducing the production cost can be provided.

What is claimed is:

1. A method of forming a button shaped magnetic head including an erasing coil and a read/write coil having internal lead wires to be connected to a plurality of terminals, comprising the steps of:
   making a metal plate having a planar spring portion attached to a plurality of terminal portions integrally formed thereon by punching out a pattern corresponding to said portions;
   insert molding the punched metal plate in a base member of the button shaped magnetic head;
   separating the portions of the metal plate so as to form a planar spring and a plurality of separate terminals for the magnetic head, wherein the terminals are separated so as to have internal end portions on an internal side of the base member spaced from and facing opposite the planar spring and their ends on an external side of the base member projecting externally therefrom;
   mounting the erasing and read/write coils on the planar spring; and
   connecting the internal lead wires of the coils to the respective internal end portions of the terminals on the internal side of the base member.

2. A method according to claim 1 wherein said internal end portion of each terminal is bent at a right angle toward the coil, which is connected by a wire with the internal end portion.

3. A method according to claim 1 wherein one of the terminals is used as a ground terminal for the planar spring.

4. A method according to claim 1 wherein said erasing coil and read/write coil are mounted on one side of said planar spring.

5. A method according to claim 1 wherein said erasing coil, read/write coil and said internal end portions of the terminals are encased in a shielding cap.

6. A button shaped magnetic head formed by the method of claim 1.